United States Patent
Wang

(10) Patent No.: US 9,915,771 B2
(45) Date of Patent: Mar. 13, 2018

(54) BACKLIGHT SYSTEM AND DISPLAY DEVICE

(71) Applicant: BOE TECHNOLOGY GROUP CO., LTD., Beijing (CN)

(72) Inventor: Shang Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 345 days.

(21) Appl. No.: 14/549,889

(22) Filed: Nov. 21, 2014

(65) Prior Publication Data

US 2015/0369990 A1  Dec. 24, 2015

(30) Foreign Application Priority Data

Jun. 24, 2014 (CN) .......................... 2014 1 0289528

(51) Int. Cl.
*F21V 8/00* (2006.01)
*G02F 1/1335* (2006.01)

(52) U.S. Cl.
CPC ........... *G02B 6/005* (2013.01); *G02B 6/0058* (2013.01); *G02F 1/133606* (2013.01);
(Continued)

(58) Field of Classification Search
CPC ......... G02F 1/133606; G02F 1/133611; F21V 14/06; F21V 5/002; F21V 5/004;
(Continued)

(56) References Cited

U.S. PATENT DOCUMENTS

2007/0147088 A1\* 6/2007 Chien .................. G02B 6/0038
362/616
2008/0106904 A1\* 5/2008 Liu .................... G02F 1/133606
362/309
(Continued)

FOREIGN PATENT DOCUMENTS

| CN | 1238045 A | 12/1999 |
|---|---|---|
| CN | 201037886 Y | 3/2008 |
| CN | 102141638 A | 8/2011 |

OTHER PUBLICATIONS

First Official Action with English translation for corresponding Chinese patent application 201410289528.5 dated Nov. 3, 2015.

*Primary Examiner* — Jong-Suk (James) Lee
*Assistant Examiner* — Christopher E Dunay
(74) *Attorney, Agent, or Firm* — Nath, Goldberg & Meyer; Joshua B. Goldberg; Annie J. Kock

(57) ABSTRACT

The present invention discloses a backlight system and a display device. In the backlight system, corresponding at least one beam expanding plate is arranged at the emergent side of a backlight module, and include a horizontal beam expanding plate and/or a vertical beam expanding plate, wherein each beam expanding plate includes an upper beam expanding sub-plate and a lower beam expanding sub-plate having the same periodic curved surface structures, the upper beam expanding sub-plate and the lower beam expanding sub-plate are arranged in parallel in such a manner that periodic curved surface structures are back-to-back against each other, and the relative position of the upper beam expanding sub-plate and the lower beam expanding sub-plate in the horizontal direction can be adjusted parallelly within a set range.

17 Claims, 4 Drawing Sheets

(52) U.S. Cl.
CPC ............ *G02B 6/003* (2013.01); *G02B 6/0036* (2013.01); *G02B 6/0053* (2013.01); *G02B 6/0055* (2013.01); *G02B 6/0073* (2013.01); *G02F 2001/133607* (2013.01)

(58) Field of Classification Search
CPC .......... F21V 5/005; F21V 5/008; F21V 17/02; F21V 5/02; G02B 26/0875; G02B 5/0278; G02B 26/0883
USPC ......................................................... 362/281
See application file for complete search history.

(56) References Cited

U.S. PATENT DOCUMENTS

| | | |
|---|---|---|
| 2008/0231772 A1 | 9/2008 | Hung |
| 2009/0021667 A1* | 1/2009 | Horiguchi ............ G02B 5/0215 349/64 |
| 2010/0135023 A1* | 6/2010 | Heise ........................ F21V 5/04 362/281 |
| 2015/0138487 A1* | 5/2015 | Hirayama ............ G02B 5/0257 349/65 |
| 2017/0030549 A1* | 2/2017 | Kamada ................. G02B 5/045 |

* cited by examiner

BACKLIGHT SYSTEM AND DISPLAY DEVICE

FIELD OF THE INVENTION

The present invention relates to the field of display technology, and in particular relates to a backlight system and a display device including the backlight system.

BACKGROUND OF THE INVENTION

A liquid crystal display (LCD) is a display using liquid crystal as a material. Under the action of an electric field, the arrangement of liquid crystal molecules will change, so as to affect the change of rays passing through the same, and the change of the rays can be represented by change in brightness under the action of a polaroid. In this way, the change of brightness of the rays can be controlled by controlling the electric field so as to achieve the purpose of displaying an image. At present, the liquid crystal display has been widely applied in application fields such as mobile phones, tablet computers, vehicle-mounted displays, projection TVs, etc. Among them, most liquid crystal displays and liquid crystal TVs are driven by TFT's (Thin Film Transistors), and this kind of liquid crystal displays can be generally called TFT-LCDs.

Specifically, a TFT-LCD is a non-self-luminous display, and a corresponding backlight module needs to be added to provide a corresponding planar light source. The backlight module is one of the key components of a liquid crystal display panel, and in general, backlight modules may be categorized into two types, that is, front light type and back light type. Specifically, back light type backlight modules may be categorized into side type, direct type and other types according to different positions of the backlight sources. Specifically, a side type backlight module is taken as an example, the side type backlight module may mainly include a light emitting diode (LED) light source, a light guide plate, a reflector plate, a diffuser plate, at least two mutually vertical light-collecting prism sheets, etc. The prism sheet may be generally called as BEF (Brightness Enhancement Film), and is used for limiting the visual angle of the liquid crystal display, so that most rays are emitted within the range of a front visual angle of ±(30°-60°), thereby achieving the light collection and brightness enhancement effects.

However, it is unfavorable to practical application that the visual angle of the liquid crystal display is set within a fixed range (for example, ±(30°-60°) mentioned above). This is because, in the actual use of the liquid crystal display, sometimes there may be only one person watching the display, and sometimes there may be many people watching the display at the same time, when only one person watches the display, the viewing demand of the user can be satisfied by providing enough brightness in the forward direction of the display; when many people watch the display at the same time, enough brightness needs to be provided within a large angle range of the display to meet the viewing demand of the users. At present, a solution of the problem is to provide a liquid crystal display with a large visual angle, however, this display will cause unnecessary energy consumption if there is only one user.

Therefore, a backlight module capable of regulating the visual angle of a liquid crystal display needs to be provided, in order to achieve free switch between a small visual angle and a large visual angle of the liquid crystal display.

SUMMARY OF TH INVENTION

Embodiments of the present invention provide a backlight system and a display device including the backlight system, which are used for solving the current problem that a backlight module with a variable visual angle could not be provided.

The embodiments of the present invention provide a backlight system, including a backlight module and at least one beam expanding plate located at an emergent side of the backlight module, wherein the at least one beam expansion plate include a horizontal beam expanding plate and/or a vertical beam expanding plate, wherein each beam expanding plate includes an upper beam expanding sub-plate and a lower beam expanding sub-plate each having the same periodic curved surface structure, the upper beam expanding sub-plate and the lower beam expanding sub-plate of each beam expanding plate are arranged in parallel in such a manner that the periodic curved surface structures are a back-to-back against each other, and a relative position of the upper beam expanding sub-plate and the lower beam expanding sub-plate in a horizontal direction is capable of being adjusted parallelly within a set range; curved surface textures of the periodic curved surface structures of the upper beam expanding sub-plate and the lower beam expanding sub-plate of the horizontal beam expanding plate extend along a horizontal axis direction, and curved surface textures of the periodic curved surface structures of the upper beam expanding sub-plate and the lower beam expanding sub-plate of the vertical beam expanding plate extend along a longitudinal axis direction.

That is to say, in the backlight system according to the embodiments of the present invention, corresponding beam expanding plate(s) may be arranged at the emergent side of the backlight module, wherein each beam expanding plate includes the upper beam expanding sub-plate and the lower beam expanding sub-plate each having the same periodic curved surface structure, the upper beam expanding sub-plate and the lower beam expanding sub-plate of each beam expanding plate are arranged in parallel in such a manner that the periodic curved surface structures are back-to-back against each other, and the relative position of the upper beam expanding sub-plate and the lower beam expanding sub-plate in the horizontal direction may be adjusted parallelly within the set range, such that the range of the visual angle of a light beam emitted by the backlight module can be controlled by means of the relative position deviation of the upper beam expanding sub-plate and the lower beam expanding sub-plate of the beam expanding plate, so as to achieve adjustable irradiation range without increasing the cost of the backlight module.

Further, in each beam expanding plate, sizes and structures of the upper beam expanding sub-plate and the lower beam expanding sub-plate are the same.

Further, in each beam expanding plate, the upper beam expanding sub-plate and the lower beam expanding sub-plate are both selected from any one of a beam expanding sub-plate with a periodic circular arc structure, a beam expanding sub-plate with a periodic free-form surface structure and a beam expanding sub-plate with a periodic prism structure.

Further, in each beam expanding plate, cycle lengths of the periodic curved surface structures of the upper beam expanding sub-plate and the lower beam expanding sub-plate are both 1-10 mm, wherein one cycle length of each of the upper beam expanding sub-plate and the lower beam expanding sub-plate is a length from a position of the thickest region of a curved surface to a position of another thickest region adjacent thereto of the curved surface in any longitudinal section.

Further, in the beam expanding plate, thicknesses at positions of respective regions of each of the upper beam expanding sub-plate and the lower beam expanding sub-plate are in a range of 0.1-1.0 mm.

Further, in the horizontal beam expanding plate, a thickness at a position of the thickest region of each of the upper beam expanding sub-plate and the lower beam expanding sub-plate is 1.0 mm, and a thickness at a position of the thinnest region is 0.1 mm.

Further, when any one of the upper beam expanding sub-plate and the lower beam expanding sub-plate of the beam expanding plate is a beam expanding sub-plate with a periodic circular arc structure, a radius of curvature of each circular arc in the periodic circular arc structure is in a range of 8-15 mm.

Further, for each beam expanding plate, when the thickest region of the upper beam expanding sub-plate and the thinnest region of the lower beam expanding sub-plate are overlaid, the beam expanding plate forms a thin plate with a bent structure, no beam expansion property and equal thickness;

when the thickest region of the upper beam expanding sub-plate and the thickest region of the lower beam expanding sub-plate are overlaid, the thinnest region of the upper beam expanding sub-plate and the thinnest region of the lower beam expanding sub-plate are overlaid, and the beam expanding plate forms a columnar lens board with periodically changing thickness and maximal beam expansion property.

Further, the backlight module is a backlight module including a direct type light source, or a backlight module including a side type light source, a light guide plate provided with a tapered V-shaped notch structure and an inverse prism film.

In this case, the direct type light source and the side type light source are respectively collimating light sources.

Further, the collimating light source includes at least one light source chip, at least one collimating lens used for collimating rays emitted by the at least one light source chip and a base heat sink used for supporting the light source chip and providing a heat dissipation function for the light source chip.

Further, the light source chip is an LED chip.

Correspondingly, the embodiments of the present invention further provide a display device, including the above-mentioned backlight system provided by the embodiments of the present invention.

The beneficial effects of the present invention are as follows:

The embodiments of the present invention provide the backlight system and the display device including the backlight system. In the technical solutions of the embodiments of the present invention, the corresponding horizontal beam expanding plate(s) and/or vertical beam expanding plate(s) may be arranged at the emergent side of the backlight module, wherein any beam expanding plate of the horizontal beam expanding plate(s) and/or the vertical beam expanding plate(s) includes the upper beam expanding sub-plate and the lower beam expanding sub-plate each having the same periodic curved surface structure, the upper beam expanding sub-plate and the lower beam expanding sub-plate are arranged in parallel in such a manner that the periodic curved surface structures are back-to-back against each other, and the relative position of the upper beam expanding sub-plate and the lower beam expanding sub-plate in the horizontal direction may be adjusted parallelly within the set range, such that the range of the visual angle of the light beam emitted by the backlight module can be controlled by means of the relative position deviation of the upper beam expanding sub-plate and the lower beam expanding sub-plate of the beam expanding plate, so as to achieve adjustable irradiation range without increasing the cost of the backlight module.

BRIEF DESCRIPTION OF THE DRAWINGS

To illustrate technical solutions in the embodiments of the present invention more clearly, a brief introduction on the accompanying drawings which are needed in the description of the embodiments is given below. Obviously, the accompanying drawings in the description below are merely some of the embodiments of the present invention, and for the person of ordinary skill in the art, other drawings may be obtained based on these accompanying drawings without any creative effort.

FIG. 6 (b) is a graph of relation between change in viewing angle and average light intensity;

DETAILED DESCRIPTION OF THE EMBODIMENTS

To make the objects, technical solutions and advantages of the present invention clearer, a further detailed description of the present invention will be given below in combination with accompanying drawings. Obviously, the embodiments described below are merely part but not all of the embodiments of the present invention. All other embodiments, obtained by those of ordinary skill in the art based on the embodiments of the present invention without any creative effort, are within the protection scope of the present invention.

Figure 1:
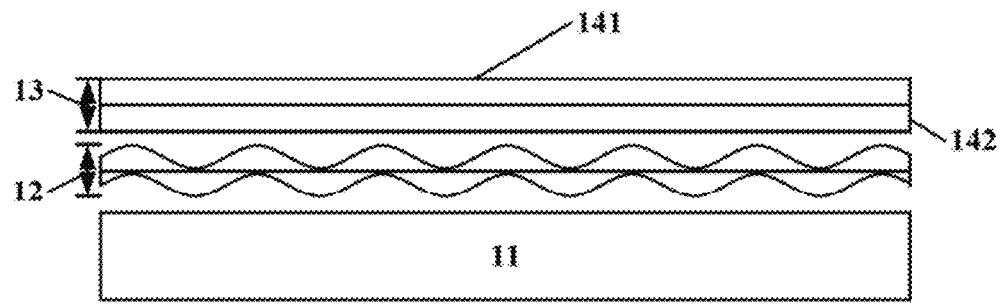
FIG. 1 is a schematic diagram of a structure of a backlight system provided by an embodiment of the present invention.

FIG. 1 schematically shows a backlight system provided by an embodiment of the present invention. As shown in FIG. 1, the backlight system provided by the embodiment of the present invention may specifically include a backlight module 11 and at least one beam expanding plate located at the emergent side of the backlight module 11, and the at least one beam expanding plate includes a horizontal beam expanding plate 12 and/or a vertical beam expanding plate 13 (specifically, in FIG. 1, schematic illustration is given by taking a case that the backlight system includes the horizontal beam expanding plate 12 and the vertical beam expanding plate 13, and the vertical beam expanding plate 13 is located on a side of the horizontal beam expanding plate 12 away from the backlight module 11 as an example; it should be noted that, in an actual situation, the vertical beam expanding plate 13 may also be located on a side of the horizontal beam expanding plate 12 close to the backlight module 11, which is not limited in the embodiment of the present invention).

Each beam expanding plate may include an upper beam expanding sub-plate and a lower beam expanding sub-plate each having the same periodic curved surface structure (in FIG. 1, the upper beam expanding sub-plate may be marked as 141 and the lower beam expanding sub-plate may be marked as 142), the upper beam expanding sub-plate and the lower beam expanding sub-plate of each beam expanding plate are arranged in parallel in such a manner that the periodic curved surface structures are back-to-back against each other (namely, the surface of the upper beam expanding sub-plate having no periodic structure and the surface of the lower beam expanding sub-plate having no periodic structure are arranged opposite to each other), and the relative position of the upper beam expanding sub-plate and the lower beam expanding sub-plate in the horizontal direction may be adjusted parallelly within a set range: here, curved surface textures of the periodic curved surface structures of the respective beam expanding sub-plates in the horizontal beam expanding plate 12 may generally extend along a horizontal axis direction (a horizontal direction in FIG. 1), curved surface textures of the periodic curved surface structures of the respective beam expanding sub-plates in the vertical beam expanding plate 13 may generally extend along a longitudinal axis direction (a direction vertical to the plane of FIG. 1), namely, the curved surface textures of the periodic curved surface structures of the two beam expanding sub-plates of the horizontal beam expanding plate 12 and those of the periodic curved surface structures of the two beam expanding sub-plates of the vertical beam expanding plate 13 may be mutually perpendicular to each other in general, and this will not be repeated in the embodiment of the present invention. Hereinafter, for ease of description, the upper beam expanding sub-plate and the lower beam expanding sub-plate can be collectively referred to as beam expanding sub-plates.

It should be noted that, in the embodiment of the present invention, the emergent side of the backlight module 11 generally refers to a side of the backlight module 11 facing a corresponding display panel. In addition, it should be noted that, for any beam expanding plate, the relative position of the included upper beam expanding sub-plate and the lower beam expanding sub-plate thereof in the horizontal direction can be adjusted parallelly within the set range, and the set range generally refers to N time(s) (N is a positive integer and may be specifically set according to an actual condition) of a half of cycle length of the periodic curved surface structure of the beam expanding sub-plate, and this is not limited in the embodiment of the present invention. It should be also noted that, for any beam expanding plate, the fact that the relative position of the included upper beam expanding sub-plate and the lower beam expanding sub-plate thereof in the horizontal direction may be adjusted parallelly within the set range refers to that the upper beam expanding sub-plate and the lower beam expanding sub-plate may move relatively to each other along the extension direction of the curved surface textures of the periodic curved surface structures thereof.

Here, for any beam expanding plate, the length from a position of the thickest region of a curved surface to a position of another thickest region adjacent thereto of the curved surface in any longitudinal section (it should be understood that, the "longitudinal section" herein refers to a section obtained by sectioning the beam expanding sub-plate along the length direction, for the horizontal beam expanding plate 12 shown in FIG. 1, the longitudinal sections of the upper beam expanding sub-plate and the lower beam expanding sub-plate thereof are sections parallel to the plane shown in FIG. 1) of the beam expanding sub-plate is one cycle length; or the length from a position of the thinnest region of a curved surface to a position of another thinnest region adjacent thereto of the curved surface in any longitudinal section of the beam expanding plate is one cycle length, which will not be repeated in the embodiment of the present invention.

Further, in the embodiment of the present invention, for ease of manufacture, the sizes and structures of the beam expanding sub-plates in the horizontal beam expanding plate and the vertical beam expanding plate are the same. Moreover, for any beam expanding sub-plate, the beam expanding sub-plate at least may be one or more of a beam expanding sub-plate with a periodic circular arc structure, a beam expanding sub-plate with a periodic free-form surface structure and a beam expanding sub-plate with a periodic prism structure, and this is not limited in the embodiment of the present invention. In addition, it should be noted that, for any beam expanding sub-plate, one surface of the beam expanding sub-plate having no periodic curved surface structure may generally be of a plane structure.

Further, a manufacturing process of the horizontal beam expanding plate 12 and the vertical beam expanding plate 13 each including an upper beam expanding sub-plate and a lower beam expanding sub-plate is described briefly, by taking a case that the beam expanding sub-plates are beam expanding sub-plates with periodic circular arc structures as an example, and the manufacturing process of the beam expanding plates may include the following steps of:

1) preparing a flat-plate type cuboid as a to-be-cut plate, wherein the to-be-cut plate may be generally a transparent glass board; 2) generating a microstructure surface curve by adopting a method of mutually connecting circular arcs to generate a curve, wherein the radius of curvature of each circular arc may be 8-15 mm; 3) stretching the generated microstructure surface curve to form a complete cutting surface in a curve lofting surface formation manner; 4) stretching the curved surface upwards and cutting off the same, so as to form a corresponding rectangular curved surface microstructure on the surface of the plate, wherein the cycle length of the microstructure may be 1-10 mm; 5) arraying the cut surface towards two directions in an array to obtain a microstructure matrix surface, and using the microstructure matrix surface as a corresponding beam expanding sub-plate; and 6) combining each two beam expanding sub-plates of the four beam expanding sub-plates in such a manner that planar surfaces are adhered together, so as to form two beam expanding plates in different directions and capable of being adjusted independently, and at this point, the corresponding horizontal beam expanding plate 12 and the vertical beam expanding plate 13 can be formed.

Specifically, it can be seen from the above-mentioned manufacturing process that, for any beam expanding sub-plate, the cycle length of the periodic curved surface structure of the beam expanding sub-plate may be generally 1-10 mm (including 1 mm and 10 mm). Of course, the cycle length of the periodic curved surface structure of the beam expanding sub-plate may also be set to other non-zero numerical value according to an actual condition, which is not limited in the embodiment of the present invention.

Further, for any beam expanding sub-plate, the thicknesses at positions of the respective regions of the beam expanding sub-plate may be generally 0.1-1.0 mm (including 0.1 mm and 1.0 mm), and this is not limited in the embodiment of the present invention. For example, for any beam expanding sub-plate, the thicknesses at a position of the thickest region of the beam expanding sub-plate may be 1.0 mm, and the thickness at a position of the thinnest region may be 0.1 mm.

Further, after the beam expanding plates are obtained, the upper beam expanding sub-plates and the lower beam expanding sub-plates of the beam expanding plates are arranged in parallel in such a manner that the periodic curved surface structures are back-to-back against each other, and the relative position of the upper beam expanding sub-plates and the lower beam expanding sub-plates in the horizontal direction may be adjusted parallelly within a set range, such that the range of the visual angle of a light beam emitted by the backlight module can be controlled by means of parallel deviation of the positions of the upper beam expanding sub-plates and the lower beam expanding sub-plates of the beam expanding plates, so as to achieve adjustable irradiation range without increasing the cost of the backlight module.

Figure 2:
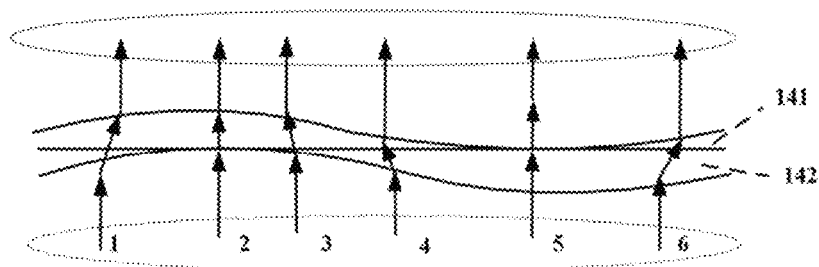
FIG. 2 is a schematic diagram of a microstructure light path of a beam expanding plate according to an embodiment of the present invention under the condition of no beam expansion property.

Specifically, the working principle of the beam expanding plate will be described briefly below, by taking different deviated positions of the upper beam expanding sub-plate and the lower beam expanding sub-plate of any beam expanding plate with the periodic circular arc structure as an example:

specifically, FIG. 2 shows a schematic diagram of a microstructure light path of a beam expanding plate according to an embodiment of the present invention under the condition of no beam expansion property, as shown in FIG. 2, for any beam expanding plate, when the thickest region (namely, the convex surface of the upper beam expanding sub-plate) of the upper beam expanding sub-plate of the beam expanding plate and the thinnest region (namely, the concave surface of the lower beam expanding sub-plate) of the lower beam expanding sub-plate are overlaid, the beam expanding plate can form a thin plate with a bent structure, no beam expansion property and equal thickness. At this time, the beam expanding plate basically does not change the propagation direction of the vertically upward light beam emitted from the lower side. Specifically, in FIG. 2, an illustration is given by taking the travel paths of six rays, which are respectively emitted from different positions, as an example:

as shown in FIG. 2, under the condition of no beam expansion property, when parallel rays reach the lower surface of the lower beam expanding sub-plate in the vertically upward direction, the propagation direction of a ray (such as rays 2 and 5 shown in FIG. 2) with incidence point just located at a positions of a horizontal tangent plane of the periodic curved surface of the lower beam expanding sub-plate remains unchanged, and the ray is continuously propagated in the vertically upward direction; when reaching the upper surface of the upper beam expanding sub-plate, the ray will passes a position of a horizontal tangent plane of the periodic curved surface of the upper beam expanding sub-plate as well, so that the ray finally passes through the beam expanding plate without deflection;

on the other hand, when the parallel rays reach the lower surface of the lower beam expanding sub-plate in the vertically upward direction, the propagation direction of a ray (such as rays 1, 3, 4 and 6 shown in FIG. 2) with incidence point located at a position of a non-horizontal tangent plane of the periodic curved surface of the lower beam expanding sub-plate is changed, but since the thickness of the beam expanding plate is a very small numerical value relative to the cycle length of the periodic curved surface structure of the beam expanding plate, the offset of the ray in the beam expanding plate in the horizontal direction is very small, such that when the ray passes through the incidence point on the lower surface of the lower beam expanding sub-plate and the incidence point on the upper surface of the upper beam expanding sub-plate, the propagation direction of the emergent ray is basically consistent with the propagation direction of the incident ray. This case is similar to the refraction effect of a flat glass board, thus it can be considered that the propagation directions of the rays 1, 3, 4 and 6 are substantially the same as those of the rays 2 and 5, and these rays leave the beam expanding plates as parallel rays.

Figure 3:
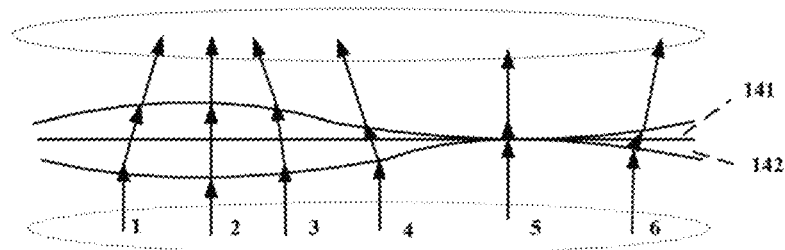
FIG. 3 is a schematic diagram of a microstructure light path of a beam expanding plate according to an embodiment of the present invention under the condition of maximal beam expansion property.

Further, FIG. 3 shows a schematic diagram of a microstructure light path of a beam expanding plate according to an embodiment of the present invention under the condition of maximal beam expansion property, as shown in FIG. 3, for any beam expanding plate, when the thickest region (namely, the convex surface of the upper beam expanding sub-plate) of the upper beam expanding sub-plate of the beam expanding plate and the thickest region (namely, the convex surface of the lower beam expanding sub-plate) of the lower beam expanding sub-plate are overlaid, and the thinnest region (namely, the concave surface of the upper beam expanding sub-plate) of the upper beam expanding sub-plate of the beam expanding plate and the thinnest region (namely, the concave surface of the lower beam expanding sub-plate) of the lower beam expanding sub-plate are overlaid, the beam expanding plate can form a columnar lens board with periodically changing thickness and maximal beam expansion property. At this time, when parallel rays reach the lower surface of the lower beam expanding sub-plate in the vertically upward direction, and when the incidence point of a ray in the parallel rays is located at a position of a horizontal tangent plane of the periodic curved surface of the lower beam expanding sub-plate, the propagation direction of the ray remains unchanged when the ray passes through the columnar lens board, and when the incidence point of a ray in the parallel rays is located at a position of a non-horizontal tangent plane of the periodic curved surface of the lower beam expanding sub-plate, the propagation direction of the ray is changed when the ray passes through the columnar lens board. Specifically, in FIG. 3, an illustration is still given by taking the travel paths of six rays, which are respectively emitted from different positions, as an example:

as shown in FIG. 3, under the condition of maximal beam expansion property, when the parallel rays reach the lower surface of the lower beam expanding sub-plate in the vertically upward direction, and when the incidence point of a ray is just located at a position of a horizontal tangent plane of the periodic curved surface of the lower beam expanding sub-plate, the direction of the ray remains unchanged, and the ray is continuously propagated in the vertically upward direction (such as rays 2 and 5 shown in FIG. 3); when reaching the upper surface of the upper beam expanding sub-plate, the ray will pass a position of a horizontal tangent plane of the periodic curved surface of the upper beam expanding sub-plate as well, so that the ray finally passes through the beam expanding plate without deflection;

on the other hand, when the parallel rays reach the lower surface of the lower beam expanding sub-plate in the vertically upward direction, and when a incidence point of a ray is on a medium interface of which the slope with respect to the horizontal plane is not zero, the propagation direction of the ray (such as rays 1, 3, 4 and 6 shown in FIG. 3) in the beam expanding plate is changed, moreover, when the ray passes through the upper surface of the upper beam expanding sub-plate, the surface slope of the periodic curved surface of the upper beam expanding sub-plate will deflect the ray by a larger angle, such that after the rays pass through the incidence point on the lower surface of the lower beam expanding sub-plate and the incidence point on the upper surface of the upper beam expanding sub-plate, the rays 1 and 3 are converged, and the rays 4 and 6 are diverged. This condition is similar to the convergence and divergence phenomena of a "cylindrical lens", and a corresponding beam expansion effect can be achieved in the deflection direction of the rays.

Figure 4:
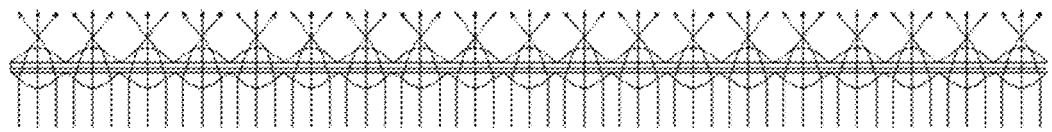
FIG. 4 is a schematic diagram of a microstructure light path of a beam expanding plate with a periodic free-form surface structure according to an embodiment of the present invention under the condition of maximal beam expansion property.

Further, it should be noted that, in the embodiment of the present invention, for any beam expanding plate, when the upper beam expanding sub-plate and the lower beam expanding sub-plate of the beam expanding plate are beam expanding sub-plates with periodic free-form surface structures, a larger beam expansion angle (namely, a larger visual range) can be generated, compared to the beam expanding sub-plates with periodic circular arc structures, as shown in FIG. 4 (FIG. 4 is a schematic diagram of a microstructure light path of a beam expanding plate with a periodic free-form surface structure according to an embodiment of the present invention under the condition of maximal beam expansion property), and this will not be repeated herein in the embodiment of the present invention.

Figure 5:
FIG. 5 is a schematic diagram of a microstructure light path of a beam expanding plate with a periodic prism structure according to an embodiment of the present invention under the condition of maximal beam expansion property.

In addition, it should be noted that, in the embodiment of the present invention, for any beam expanding plate, when the upper beam expanding sub-plate and the lower beam expanding sub-plate of the beam expanding plate are beam expanding sub-plates with periodic prism structures (e.g., periodic isosceles triangle prism structures), while generating the beam expansion phenomenon, the beam expanding plate can also generate a vision-divided backlight effect, as shown in FIG. 5 (FIG. 5 is a schematic diagram of a microstructure light path of a beam expanding plate with a periodic prism structure according to an embodiment of the present invention under the condition of maximal beam expansion property), and this will not be repeated herein in the embodiment of the present invention.

Further, in order to better understand the beam expansion effect of the beam expanding plate according to the embodiment of the present invention, energy of light beams on which no beam expansion is performed through the beam expanding plate and energy of light beams on which horizontal beam expansion and/or vertical beam expansion has/have been performed through the beam expanding plate are described briefly below, by taking that the cycle length of the periodic curved surface structure is 10 mm as an example.

Figure 6A:
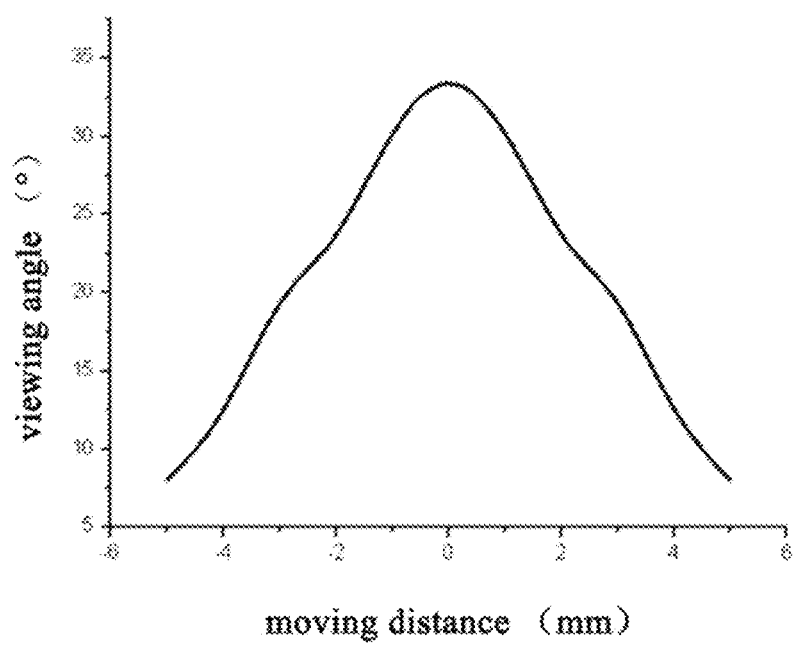
FIG. 6 (a) is a graph of relation between position deviation of a beam expanding sub-plate and an emergent viewing angle.
Figure 6B:
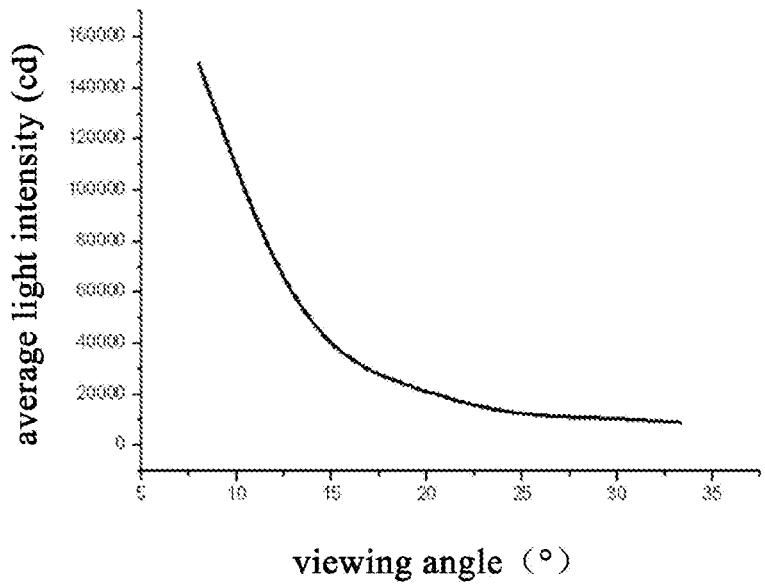

Specifically, when the horizontal beam expanding plate 12 and the vertical beam expanding plate 13 are respectively set to have no beam expansion property by adjusting the parallel deviation of the included upper beam expanding sub-plates and lower beam expanding sub-plates thereof parallel light beams emitted into one cycle length of the periodic curved surface structure in the vertically upward direction can form a facula (the facula is defined as the first facula) with very concentrated energy on a preset receiving screen after passing through the two beam expanding plates. When absorption by an optical dielectric material and Fresnel reflection are not taken into consideration, it is assumed that the first facula can concentrate 66.0% of the light energy emitted by a light source;

when the horizontal beam expanding plate 12 is set to have the maximal beam expansion property by adjusting the parallel deviation of the included upper beam expanding sub-plate and lower beam expanding sub-plate thereof, and the vertical beam expanding plate 13 is arranged to have no beam expansion property by adjusting the parallel deviation of the included upper beam expanding sub-plate and lower beam expanding sub-plate thereof, parallel light beams emitted into one cycle length of the periodic curved surface structure in the vertically upward direction form a second facula on the preset receiving screen after passing through the horizontal beam expanding plate 12 and the vertical beam expanding plate 13, and the second facula may be a facula stretched to a set first length in the horizontal axis direction relative to the first facula; moreover, it can be known from FIG. 6 (a) and FIG. 6 (b) that (FIG. 6 (a) and FIG. 6 (b) are respectively a schematic diagram illustrating influence of position deviation of beam expanding sub-plates on a viewing angle of emergent light and a schematic diagram illustrating influence of change in viewing angle on average light intensity), the light energy of the second facula can be 66.1% of the energy emitted by the light source.

Further, when the horizontal beam expanding plate 12 is set to have no beam expansion property through the parallel deviation of the included upper beam expanding sub-plate and lower beam expanding sub-plate thereof, and the vertical beam expanding plate 13 is set to have the maximal beam expansion property by adjusting the parallel deviation of the included upper beam expanding sub-plate and lower beam expanding sub-plate thereof, the parallel light beams emitted into one cycle length of the periodic curved surface structure in the vertically upward direction form a third facula on the preset receiving screen after passing through the horizontal beam expanding plate 12 and the vertical beam expanding plate 13, and the third facula can be a facula stretched to a set second length (when the structures of the respective beam expanding sub-plates of the horizontal beam expanding plate 12 and the vertical beam expanding plate 13 are the same, generally, the second length may be equal to the above-mentioned first length) in the longitudinal axis direction relative to the first facula; moreover, at this time, it can be seen from FIG. 6 (a) and FIG. 6 (b) that the light energy of the third facula can be 66.1% of the energy emitted by the light source;

Further, when both the horizontal beam expanding plate 12 and the vertical beam expanding plate 13 are set to have the maximal beam expansion property by adjusting the parallel deviation of the included upper beam expanding sub-plates and lower beam expanding sub-plates thereof, the parallel light beams emitted into one cycle length of the periodic curved surface structure in the vertically upward direction form a fourth facula on the preset receiving screen after passing through the horizontal beam expanding plate 12 and the vertical beam expanding plate 13, the fourth facula can be a rectangular facula stretched to the set first length in the horizontal axis direction and stretched to the set second length in the longitudinal axis direction relative to the first facula; moreover, at this time, it can be seen from FIG. 6 (a) and FIG. 6 (b) that, the light energy of the rectangular facula can be 66.2 of the energy emitted by the light source, and the beam expansion angle can be ±16.7.

That is to say, in adjusting the irradiation range, light energy loss caused by the beam expanding plate basically remains unchanged, and thus has no influence on the collimated light flux. By adopting this beam expanding method, a light type beam expansion system with adjustable light type can be achieved without replacing the beam expanding plate; when the light type needs to be replaced, the horizontal relative position of the upper beam expanding sub-plate and the lower beam expanding sub-plate of the beam expanding plate can be fine adjusted to realize adjustable irradiation range, which makes it quite easy for a user of the backlight to adjust luminance, and meanwhile, since there is no need to prepare a large quantity of beam expanding plates, the actual cost can also be reduced.

Further, in the embodiment of the present invention, the backlight module 11 may be a backlight module including a direct type light source 20, or, the backlight module may be a backlight module including a side type light source 31, a light guide plate 32 provided with a tapered V-shaped notch structure and an inverse prism film 33; that is, the backlight module 11 may be a direct type backlight module or a side type backlight module, which is not limited in the embodiment of the present invention at all.

Figure 7:
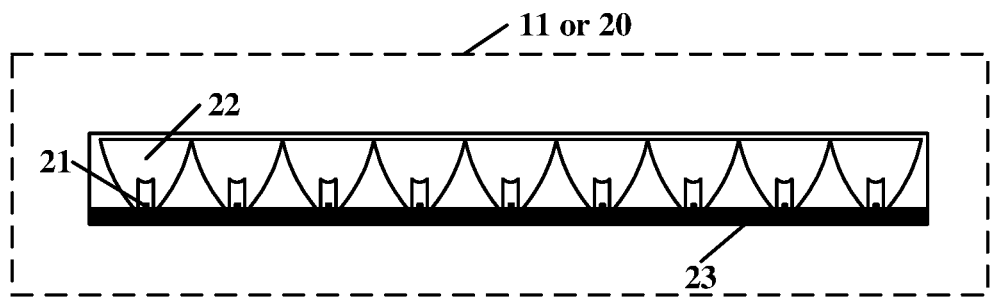
FIG. 7 is a schematic diagram of a structure of a direct type backlight module.

Further, when the backlight module 11 is a backlight module including a direct type light source 20, the schematic diagram of the structure of the backlight module 11 may be shown in FIG. 7. In FIG. 7, the direct type light source 20 may be a collimating light source. Further, the collimating light source may include at least one light source chip 21, at least one collimating lens 21 used for collimating the rays emitted by the at least one light source chip 21 and a base heat sink 23 used for supporting the light source chip 21 and providing a heat dissipation function for the light source chip 21.

Specifically, the light source chip 21 may be an LED chip; of course, the light source chip 21 may also be an LED white light encapsulation module or other white light chips, which is not limited in the embodiment of the present invention at all.

Further, the collimating lens 22 may be generally a lens having a free-form surface structure constructed according to the total reflection or refraction law, to collimate the rays emitted by the light source through the corresponding free-form surface structure; the visual angle of the collimated emergent light beams may be effectively narrowed so as to form a narrow visual angle backlight, and at this time, the light beams are substantially emitted out in a direction perpendicular to the surface of the backlight source, which will not be repeated in the embodiment of the present invention.

Further, the main functions of the base heat sink 23 may specifically include: 1) providing a supporting substrate for the light source chip 21 so that the light source chip 21 may have a welding carrier and the light source chip 21 may be arranged on the upper surface of the base heat sink 23 in an array and 2) providing a heat dissipation structure for the light source chip 21 so that the light source chip 21 can conduct heat to the base heat sink 23 by means of welding contact with the base heat sink 23, so as to reduce the junction temperature of the light source chip 21. Further, a corresponding high reflecting layer may also be provided on the upper surface of the base heat sink 23 through an evaporation or adhesion to recycle light energy of the light source through the high reflecting layer, which will not be repeated in the embodiment of the present invention.

Figure 8:
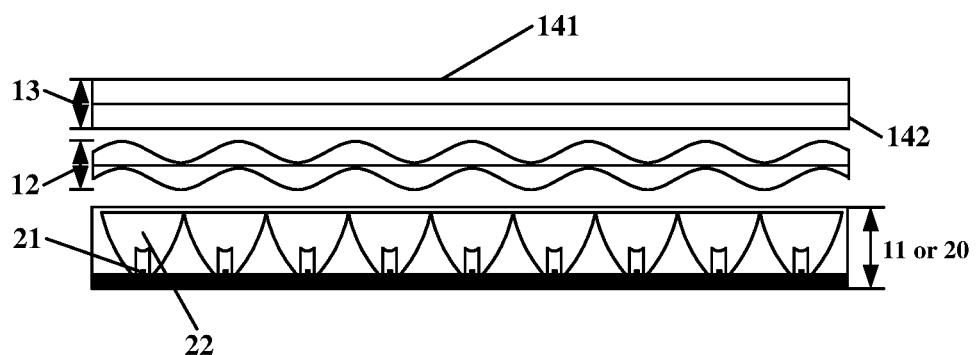
FIG. 8 is a schematic diagram of a structure of a backlight system provided by an embodiment of the present invention when the backlight module is a direct type backlight module.

Further, it should be noted that, when the backlight module 11 is the backlight module including the direct type light source 20, the emergent side of the backlight module 11 may generally refer to the emergent side of the direct type light source 20; correspondingly, at this time, the schematic diagram of a structure of the corresponding backlight system may be shown in FIG. 8, which will not be repeated in the embodiment of the present invention.

Figure 9:
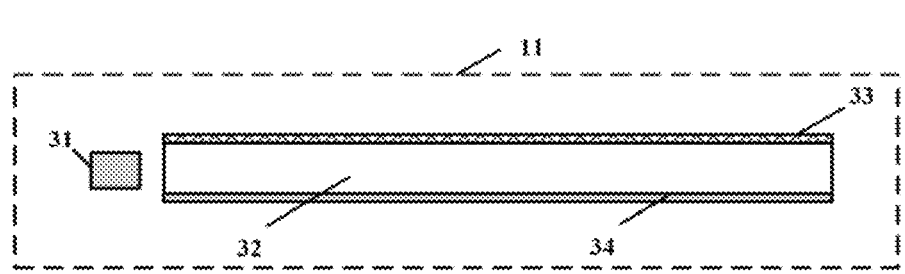
FIG. 9 is a schematic diagram of a structure of a side type backlight module.

Further, when the backlight module 11 is the backlight module including the side type light source 31, the light guide plate 32 provided with the tapered V-shaped notch structure and the inverse prism film 33, the schematic diagram of a structure of the corresponding backlight module 11 may be shown in FIG. 9. In FIG. 9, the light guide plate 32 may be located at the emergent side of the side type light source 31; the inverse prism layer 33 may be located on the upper surface of the light guide plate 32; in addition, a corresponding prism layer may be provided on the lower surface of the light guide plate 32 to achieve a corresponding tapered V-shaped notch structure, which will not be repeated in the embodiment of the present invention.

Specifically, the side type light source 31 may be a collimating light source, for example, may be an LED light source that can emit parallel rays itself or an LED light source (as shown in FIG. 7) provided with a corresponding collimating lens group, or any other light sources that can emit collimating light beams, which is not limited in the embodiment of the present invention at all.

Further, the light guide plate 32 is a light guide plate with a narrow visual angle, namely, the prism layer provided on the lower surface of the light guide plate 32 may be used for enabling the light beam emitted by the collimating light source to be emitted to the lower surface of the inverse prism film 33 at an inclination angle, and the light beam is collimated through the prism structure on the lower surface of the inverse prism film 33 so that the light beam finally exist in a direction perpendicular to the surface of the light guide plate 32, namely, the narrow visual angle backlight of the side type light guide plate is achieved.

Further, a corresponding bottom reflecting film 34 may be arranged on the lower surface of the light guide plate 32, in order to recycle the light beam in the light guide plate 32, which will not be repeated in the embodiment of the present invention.

Figure 10:
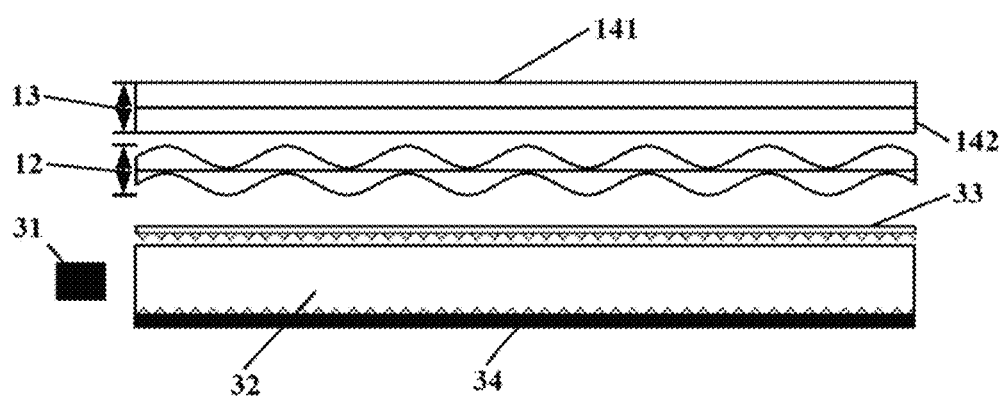
FIG. 10 is a schematic diagram of a structure of a backlight system provided by an embodiment of the present invention when the backlight module is a side type backlight module.

Further, it should be noted that, when the backlight module 11 is the backlight module including the side type light source 31, the light guide plate 32 provided with the tapered V-shaped notch structure and the inverse prism film 33, the emergent side of the backlight module 11 may generally refer to the emergent side of the light guide plate 32; correspondingly, at this time, the schematic diagram of a structure of the corresponding backlight system may be shown in FIG. 10, which will not be repeated in the embodiment of the present invention.

Based on the same inventive concept, the embodiments of the present invention further provide a display device, including any of the above-mentioned backlight systems provided by the embodiments of the present invention, and the display device may be any product or component with a display function, such as a mobile phone, a tablet computer, a TV, a display, a notebook computer, a digital photo frame, a navigator or the like. The implementation of the display device may refer to the embodiment of the above-mentioned backlight system, and will not be repeated herein.

The embodiment of the present invention provides the backlight system and the display device, in the technical solutions of the embodiment of the present invention, the corresponding horizontal beam expanding plate and/or the vertical beam expanding plate may be arranged at the emergent side of the backlight module, for any beam expanding plate, it is composed of the upper beam expanding sub-plate and the lower beam expanding sub-plate each having the same periodic curved surface structure, the upper beam expanding sub-plate and the lower beam expanding sub-plate of the any beam expanding plate are arranged in parallel in such a manner that the periodic curved surface structures are back-to-back against each other, and the relative position of the upper beam expanding sub-plate and the lower beam expanding sub-plate in the horizontal direction may be adjusted parallelly within the set range, such that the range of the visual angle of the light beam emitted by the backlight module can be controlled by means of the position deviation of the upper beam expanding sub-plate and the lower beam expanding sub-plate of the beam expanding plate, so as to achieve adjustable irradiation range without increasing the cost of the backlight module.

In addition, in the technical solutions of the present invention, narrow visual angle illumination can be achieved by directly adding the corresponding collimating lens above the LED light source chip and the like, or the light beam can be collimated by combining the collimating light source with the light guide plate provided with the tapered V-shaped notch structure, so as to achieve a narrow visual angle backlight, such that the backlight system can be applicable to both a direct type or side type narrow visual angle backlight structure of a liquid crystal display and an illumination module with a variable illumination region, as a result, the practicability of the backlight system is improved.

Although the preferable embodiments of the present invention have been described, but once obtaining the basic inventive concept, a person skilled in the art can make additional variations and modifications to these embodiments. Therefore, the appended claims are intended to be interpreted as including the preferable embodiments and all variations and modifications within the scope of the present invention.

Obviously, various modifications and variations can be made to the present invention by a person skilled in the art without departing from the spirit and scope of the present invention. Thus the present invention is also intended to encompass these modifications and variations if these modifications and variations are within the scope of the claims of the present invention and their equivalent technologies.

The invention claimed is:

1. A backlight system, comprising a backlight module and at least one beam expanding plate located at an emergent side of the backlight module, the at least one beam expanding plate comprising a horizontal beam expanding plate and/or a vertical beam expanding plate, wherein each beam expanding plate comprises an upper beam expanding sub-plate and a lower beam expanding sub-plate, a surface of the upper beam expanding sub-plate distal to the lower beam expanding sub-plate is a periodic curved surface, and a surface of the lower beam expanding sub-plate distal to the upper beam expanding sub-plate is a periodic curved surface, and the upper beam expanding sub-plate and the lower beam expanding sub-plate are capable of moving relatively to each other within a set range in a direction perpendicular to a light emergent direction of the backlight module; curved surface textures of periodic curved surface structures of the upper beam expanding sub-plate and the lower beam expanding sub-plate of the horizontal beam expanding plate extend along a horizontal axis direction, and curved surface textures of periodic curved surface structures of the upper beam expanding sub-plate and the lower beam expanding sub-plate of the vertical beam expanding plate extend along a longitudinal axis direction.

2. The backlight system of claim 1, wherein in each beam expanding plate, sizes and structures of the upper beam expanding sub-plate and the lower beam expanding sub-plate are the same.

3. The backlight system of claim 1, wherein in each beam expanding plate, the upper beam expanding sub-plate and the lower beam expanding sub-plate are both selected from one or more of a beam expanding sub-plate with a periodic circular arc structure, a beam expanding sub-plate with a periodic free-form surface structure and a beam expanding sub-plate with a periodic prism structure.

4. The backlight system of claim 1, wherein in each beam expanding plate, cycle lengths of the periodic curved surface structures of the upper beam expanding sub-plate and the lower beam expanding sub-plate are 1-10 mm, and one cycle length of each of the upper beam expanding sub-plate and the lower beam expanding sub-plate is a length from a position of the thickest region of a curved surface to a position of another thickest region adjacent thereto of the curved surface in any longitudinal section.

5. The backlight system of claim 1, wherein in each beam expanding plate, thicknesses at positions of respective regions of each of the upper beam expanding sub-plate and the lower beam expanding sub-plate are in a range of 0.1-1.0 mm.

6. The backlight system of claim 5, wherein a thickness at a position of the thickest region of each of the upper beam expanding sub-plate and the lower beam expanding sub-plate is 1.0 mm, and a thickness at a position of the thinnest region is 0.1 mm.

7. The backlight system of claim 4, wherein when any one of the upper beam expanding sub-plate and the lower beam expanding sub-plate of the beam expanding plate is a beam expanding sub-plate with a periodic circular arc structure, a radius of curvature of each circular arc in the periodic circular arc structure is in a range of 8-15 mm.

8. The backlight system of claim 1, wherein for each beam expanding plate, when the thickest region of the upper beam expanding sub-plate and the thinnest region of the lower beam expanding sub-plate are overlaid, the beam expanding plate forms a thin plate with a bent structure, no beam expansion property and equal thickness; and when the thickest region of the upper beam expanding sub-plate and the thickest region of the lower beam expanding sub-plate are overlaid, and the thinnest region of the upper beam expanding sub-plate and the thinnest region of the lower beam expanding sub-plate are overlaid, the beam expanding plate forms a columnar lens board with periodically changing thickness and maximal beam expansion property.

9. The backlight system of claim 1, wherein the backlight module is a backlight module comprising a direct type light source; or, the backlight module is a backlight module comprising a side type light source, a light guide plate provided with a tapered V-shaped notch structure and an inverse prism film.

10. The backlight system of claim 9, wherein the direct type light source and the side type light source are collimating light sources, respectively.

11. The backlight system of claim 10, wherein the collimating light source comprises at least one light source chip, at least one collimating lens used for collimating rays emitted by the at least one light source chip and a base heat sink used for supporting the light source chip and providing a heat dissipation function for the light source chip.

12. The backlight system of claim 11, wherein the light source chip is a light emitting diode chip.

13. A display device, comprising a backlight system, wherein the backlight system is the backlight system of claim 1.

14. The display device of claim 13, wherein in each beam expanding plate, sizes and structures of the upper beam expanding sub-plate and the lower beam expanding sub-plate are the same.

15. The display device of claim 13, wherein in each beam expanding plate, the upper beam expanding sub-plate and the lower beam expanding sub-plate are both selected from one or more of a beam expanding sub-plate with a periodic circular arc structure, a beam expanding sub-plate with a periodic free-form surface structure and a beam expanding sub-plate with a periodic prism structure.

16. The display device of claim 13, wherein for each beam expanding plate, when the thickest region of the upper beam expanding sub-plate and the thinnest region of the lower beam expanding sub-plate are overlaid, the beam expanding plate forms a thin plate with a bent structure, no beam expansion property and equal thickness;

when the thickest region of the upper beam expanding sub-plate and the thickest region of the lower beam expanding sub-plate are overlaid, and the thinnest region of the upper beam expanding sub-plate and the thinnest region of the lower beam expanding sub-plate are overlaid, the beam expanding plate forms a columnar lens board with periodically changing thickness and maximal beam expansion property.

17. The display device of claim 13, wherein the backlight module is a backlight module comprising a direct type light source; or, the backlight module is a backlight module comprising a side type light source, a light guide plate provided with a tapered V-shaped notch structure and an inverse prism film.

* * * * *